(12) United States Patent
Ficker et al.

(10) Patent No.: US 8,098,208 B2
(45) Date of Patent: Jan. 17, 2012

(54) ANTENNA CONFIGURATION AND USE THEREOF

(75) Inventors: Jurgen Ficker, Erlangen (DE); Heinrich Wild, Herzogenaurach (DE); Wolfgang Clemens, Puschendorf (DE); Walter Lehnberger, Treuchtlingen (DE); Markus Lorenz, Haibach (DE)

(73) Assignee: PolyIC GmbH & Co. KG, Furth (DE)

( * ) Notice: Subject to any disclaimer, the term of this patent is extended or adjusted under 35 U.S.C. 154(b) by 454 days.

(21) Appl. No.: 12/302,555

(22) PCT Filed: May 26, 2007

(86) PCT No.: PCT/EP2007/004702
§ 371 (c)(1),
(2), (4) Date: Dec. 18, 2008

(87) PCT Pub. No.: WO2007/137798
PCT Pub. Date: Dec. 6, 2007

(65) Prior Publication Data
US 2009/0231203 A1 Sep. 17, 2009

(30) Foreign Application Priority Data
May 30, 2006 (DE) .......................... 10 2006 025 485

(51) Int. Cl.
*H01Q 1/38* (2006.01)
(52) U.S. Cl. ...... 343/841; 343/795; 343/895; 340/572.7
(58) Field of Classification Search .................. 343/702, 343/741, 742, 866, 867, 895, 795, 841; 340/572.7, 340/572.8
See application file for complete search history.

(56) References Cited

U.S. PATENT DOCUMENTS

| 4,865,197 A | 9/1989 | Craig |
| 6,107,920 A | 8/2000 | Eberhardt et al. |

(Continued)

FOREIGN PATENT DOCUMENTS

DE 4401089 A1 7/1995
(Continued)

OTHER PUBLICATIONS

Finkenzeller, Klaus, "RFID-Handbook", Fundamentals and Applications in Contactless Smart Cards and Identification, Second Edition,John Wiley & Sons, Ltd., Chichester, England, 1999, 2003, pp. 177-179.

(Continued)

*Primary Examiner* — Michael C Wimer
(74) *Attorney, Agent, or Firm* — Carella, Byrne, Cecchi; Elliot M. Olstein; William Squire (57) ABSTRACT

The invention relates to an antenna configuration, comprising at least one electrically insulating carrier substrate and at least one electrically conductive layer applied on at least one side of the carrier substrate, the electrically conductive layer having a first area region and a second area region, and the first area region of the electrically conductive layer having the form of at least one antenna structure. The at least one antenna structure is present in a manner electrically insulated from the second area region of the electrically conductive layer, and the second area region of the electrically conductive layer is subdivided, at least in regions directly adjacent to the at least one antenna structure, into island regions that are at least electrically insulated from one another. The at least one antenna configuration is suitable for use for contactlessly coupled transponders, in particular for RFID Tags or Smart Tags.

28 Claims, 6 Drawing Sheets

U.S. PATENT DOCUMENTS

| | | |
|---|---|---|
| 6,320,556 B1 | 11/2001 | Cyman et al. |
| 6,483,473 B1 | 11/2002 | King et al. |
| 7,847,695 B2 * | 12/2010 | Ficker et al. ............... 340/572.1 |
| 2005/0046573 A1 | 3/2005 | DeVelasco et al. |
| 2005/0210658 A1 | 9/2005 | Schmid et al. |
| 2008/0061986 A1 | 3/2008 | Ficker et al. |

FOREIGN PATENT DOCUMENTS

| | | |
|---|---|---|
| DE | 19610284 A1 | 8/1997 |
| DE | 19629269 | 1/1998 |
| DE | 10058559 A1 | 5/2002 |
| DE | 10229168 A1 | 1/2004 |
| DE | 102004040831 | 3/2006 |
| EP | 1227434 A1 | 7/2002 |
| EP | 1318084 A1 | 11/2003 |
| EP | 1422168 A1 | 5/2004 |
| JP | 11238103 | 8/1999 |
| TW | 517428 | 7/1990 |

OTHER PUBLICATIONS

Harrop, Peter, "RFID in Packaging", Pira International Ltd., "Pira on Printing", 2002, ISBN 1858029457, pp. 47-49.

* cited by examiner

ANTENNA CONFIGURATION AND USE THEREOF

The invention relates to an antenna configuration comprising at least one electrically insulating carrier substrate and at least one electrically conductive layer applied on at least one side of the carrier substrate. The invention furthermore relates to a use of the antenna configuration.

Such antenna configurations are known from DE 196 29 269 A1 for smart cards. The antenna structure is produced here by etching an electrically conductive layer which is arranged on an electrically insulating plastic layer and is printed with etching-resistant photoresist in regions. In the regions of the electrically conductive layer that are not coated by photoresist, said layer is removed by etching, the regions of the electrically conductive layer that are covered with photoresist in the form of a conductor track or antenna structure remaining on the plastic layer. Afterward, if appropriate, the photoresist is removed and the antenna structure is covered with protective lacquer.

Such a method for producing an antenna structure is relatively time-consuming. Furthermore, owing to the removal of the electrically conductive layer that is necessary over a large area, large amounts of waste materials arise, which have to be disposed of or recycled.

In order to reduce the amount of material to be removed by etching and, at the same time, the requirement for etchant, it has therefore been attempted to remove the electrically conductive layer by etching only in the region of the contours of the antenna structure.

It has been shown, however, that in the regions of the electrically conductive layer which remain on the electrically insulating carrier substrate and are adjacent to the antenna structure, electrical effects that lead to an impairment of the antenna power occur during electrical operation of the antenna structure. Thus, by way of example, disturbing eddy currents are formed in regions of the electrically conductive layer which are enclosed by the antenna structure. Furthermore, regions of the electrically conductive layer can generate interference on account of reflection of electromagnetic waves.

Consequently, the object formulated is that of providing an antenna configuration that is improved with regard to the problems mentioned above.

The object is achieved for the antenna configuration, comprising at least one electrically insulating carrier substrate and at least one electrically conductive layer applied on at least one side of the carrier substrate, by virtue of the fact that the electrically conductive layer has a first area region and a second area region, the first area region of the electrically conductive layer having the form of at least one antenna structure, that the at least one antenna structure is present in a manner electrically insulated from the second area region of the electrically conductive layer and that the second area region of the electrically conductive layer is subdivided, at least in regions directly adjacent to the at least one antenna structure, into island regions that are at least electrically insulated from one another.

In the case of the antenna configuration according to the invention it is now possible for regions of the electrically insulating layer which are not associated with the at least one antenna structure to remain on the carrier substrate. By virtue of these regions of the electrically conductive layer being subdivided into island regions that are at least electrically insulated from one another, the antenna power is no longer impaired since the formation of eddy currents or wave reflections that are disturbing for the use of the antenna configuration in the electric field is significantly reduced or even prevented.

An additional advantage is that the antenna configuration according to the invention can be produced particularly cost-effectively and is therefore suitable for mass-produced articles such as labels or the like.

It is pointed out that the island regions do not have to be formed on all sides of the contour of the at least one antenna structure, rather that for electrical operation it suffices if the residual parts of the electrically conductive layer which are not associated with the at least one antenna structure are subdivided into at least two regions that are electrically isolated from one another. Thus, antenna structures are often connected to electrical conductor tracks which electrically connect an antenna structure to further components and which, of course, cannot also be subdivided into island regions since a good electrical conductivity of the conductor tracks is of importance.

It has proved to be worthwhile if, as seen perpendicularly to the plane of the electrically conductive layer, each island region has a maximum dimension that is $\leq 50\%$ of a maximum dimension of the at least one antenna structure. It is particularly preferred here if, as seen perpendicularly to the plane of the electrically conductive layer, each island region has a maximum dimension that is $\leq 25\%$ of the maximum dimension of the at least one antenna structure, in particular $\leq 10\%$ of the maximum dimension of the at least one antenna structure. The exact size of the island regions can be different for each intended use of an antenna structure, for example larger for lower frequencies than for higher frequencies of the electromagnetic radiation. In this case, the island structures furthermore also do not have to be embodied in uniform fashion. Thus, effects such as, for example, a direction dependence or a frequency dependence can be fostered in a targeted manner by the formation of specific island structures.

Furthermore, it has proved to be worthwhile if, as seen perpendicularly to the plane of the electrically conductive layer, the electrically conductive layer is subdivided into island regions up to at least a distance A away from the at least one antenna structure as seen from each point of the at least one antenna structure, the distance A being at least 50% of the maximum dimension of the at least one antenna structure. Excluded from this, however, are the conductor tracks already mentioned above with which an antenna structure is electrically contact-connected, if appropriate.

Furthermore, it has proved to be worthwhile if an electrical insulation trench is formed between adjacent island regions by virtue of the fact that in the region of a contour of an island region, as seen perpendicularly to the plane of the electrically conductive layer, the electrically conductive layer is severed or a layer thickness of the electrically conductive layer is reduced.

A complete severing of the electrically conductive layer is not necessary as long as the respective insulation trench locally effects a corresponding increase in the electrical resistance. If the electrically conductive layer is entirely severed, then it has proved to be worthwhile if the insulation trench also extends into adjacent regions of the carrier substrate. However, in this case the carrier substrate is intended neither to be severed nor to be significantly impaired in terms of its carrying properties. It is particularly preferred if an insulation trench, as seen perpendicularly to the at least one electrically conductive layer, has a width of less than 1 mm. Preferably, the width of the insulation trench is significantly smaller, in particular <100 µm.

Such an insulation trench can be formed in various ways. Known methods such as stamping, etching, laser cutting, scraping, embossing, nanoimprint lithography or the like can also be used.

Methods are furthermore suitable in which an increase in resistance is produced by chemical treatment of the electrically conductive layer locally, for example by an oxidation or the like, without bringing about material erosion. Instead of an insulation trench, an electrically insulating barrier is formed in this case.

A combined stamping-etching method is particularly preferred, however, as will be described below.

The preferred stamping-etching method comprises the following steps with regard to the antenna configuration to be produced thereby:

providing a carrier substrate, which is covered on at least one side, in particular over the whole area, with the at least one electrically conductive layer having a layer thickness D;

stamping the electrically conductive layer, at least one gap having a height H being formed in the electrically conductive layer perpendicularly to a plane spanned by the electrically conductive layer, the course of said gap in the plane determining the contour of the at least one antenna structure and of the individual island regions, the at least one gap being formed in such a way that the height H of the gap is less than or equal to the layer thickness D of the electrically conductive layer, and the electrically conductive layer subsequently being etched in such a way that the electrically conductive layer is severed in the region of the at least one gap and the gap is extended.

This preferred method provides a particularly economical, environmentally friendly and production-reliable etching-based stamping method which, in addition to a very high process speed, also has the further advantage that cost-effective, simply formed stamping tools can be used and conductor structures down to less than 1 mm can furthermore be obtained. Regions having a width of up to 800 μm can thus be obtained including the case of ductile materials (e.g. aluminum, copper).

The preferred method, which can be carried out continuously, in particular, is practicable using conventional stamping machines, standard tools and etching installations which can be modified cost-effectively and without a high technical outlay.

The stamping is succeeded, in particular directly, by an etching process adapted to the respective electrically conductive material of the electrically conductive layer. This leads firstly to a complete mechanical and electrical separation of stamped, adjacent electrically conductive area regions, such that short circuits can no longer occur between them. Secondly, a surface activation of the stamped electrically conductive layer is effected at the same time, at least in regions, after contaminants or oxide layers possibly present on the surface of the electrically conductive layer on account of the etching process are removed. This is advantageous particularly for a subsequent inline process step such as, for example, a bonding method for electrically connecting the antenna structure to a chip, an adhesive-bonding method wherein a conductive adhesive is applied, or a soldering method. Significant advantages with regard to the obtainable adhesion force and quality of the electrical contact-connection are afforded on account of the surface activation.

It has been shown that in the regions of the electrically conductive layer which bound the gaps formed by the stamping, the etching attack takes place significantly faster than in regions that were not stamped. This is explained by the fact that the gaps sever any layers present which impede the etching, such as grease or oxide layers, on the electrically conductive layer. This makes it possible to produce particularly fine electrically conductive structures, even below the millimeter range attainable by a method just involving stamping, in conjunction with an increased process speed.

In comparison with standard etching processes, only fractions of the electrically conductive layer are removed, which further increases the process speed. Thus, for example in the case of an electrically conductive layer formed by a 50 μm thick aluminum layer, only $\frac{1}{25}^{th}$ to $\frac{1}{50}^{th}$ of the metal is to be etched if the layer thickness of 50 μm has been cut through in the region of the gap down to a web of just 1 μm to 2 μm. The preferred method therefore affords the particular advantage that extremely small amounts of waste materials arise.

Complete stamping through the carrier substrate can be avoided in the method according to the invention since a relatively large tolerance of the stamping gap has to be complied with, such that even after stamping the carrier substrate still has a sufficiently high breaking strength so as to be able to be optimally processed further.

It has proved to be worthwhile if the at least one antenna structure has the form of a spiral having at least one turn which encloses a second area region, the enclosed second area region being subdivided into island regions. In this case, however, a spiral is not just understood to mean spiral structures based essentially on the form of a circle or ellipse. Spiral forms having an outer circumference in the form of a rectangle, polygon or a meandering form are also intended to be encompassed here by the term spiral. The formation of eddy currents within the area regions of the electrically conductive layer which are enclosed by a spiral is effectively prevented by the subdivision of the electrically conductive layer into island regions.

It has furthermore proved to be worthwhile if the at least one turn is enclosed by a further second area region which is subdivided into island regions. This likewise prevents the effect of eddy current formation which forms in the further second area region enclosing the turn. The subdivision of the further second area region into island regions likewise prevents any occurrence of eddy currents or mutual induction and occurrence of wave reflections.

As an alternative, it has proved to be worthwhile if the at least one antenna structure is embodied as a dipole, in T-shaped fashion, in L-shaped fashion, in U-shaped fashion or as a combination of such antenna structures.

The form of an antenna structure depends greatly on the radio frequency used, on a use in the near field or in the far field, and on the type of coupling. Typically, antenna structures are used for the low-frequency to high-frequency range (typically frequencies) of <50 MHz; most often 125 to 135 kHz, 8.2 MHz or 13.56 MHz) in the near field and are shaped as a coil arrangement for inductive coupling. There is furthermore the possibility of using a capacitive coupling in this frequency range, the antenna structure having a dipole construction. Antenna structures for the ultra high-frequency to microwave range (typically >100 MHz; most often 400 to 500 MHz, 850 to 950 MHz and 2 to 2.5 GHz) are usually used in the far field and constructed as a dipole antenna. The exact form of an antenna structure is dependent on the respective field of use. By way of example, an adaptation to a transponder chip, an optimization of the range or a setting with regard to maximum direction independence is effected.

It is preferred if the carrier substrate has a thickness within the range of 10 μm to 5 mm. Furthermore, it is preferred if the carrier substrate comprises a plastic film, in particular composed of PET, PP, PPS, PES, PEN or polyimide, and/or a paper or cardboard layer. In particular, it can also be provided that the carrier substrate comprises at least two different layers, such as paper and plastic film. In this case, one or a plurality of adhesive layers can be integrated. The carrier substrate can be embodied in either rigid or flexible fashion. Furthermore, the carrier substrate can have a certain inherent functionality. By way of example, it can be embodied as a sticker or label and in this case, have in particular product information, a bar code and the like. Furthermore, the carrier substrate can form a packaging material or serve as a substrate for an optical and/or electrical component.

After the completion of an antenna configuration, further process steps can be performed and, if appropriate, one or a plurality of further layers, for example composed of lacquer, paper, plastic or the like, can be applied.

It is advantageous if the carrier substrate including the electrically conductive layer is processed in a continuous or quasi-continuous process. In this case, a quasi-continuous process is understood to mean a processing of separated carrier substrate sections which are successively processed in series and/or supplied alongside one another without intermediate storage to the successive process steps of the method. A continuous process is understood to mean one in which the carrier substrate is configured in as it were endless fashion, in particular in flexible and strip-type fashion, and is supplied without intermediate storage to the successive process steps of the method, in particular is processed in a roll-to-roll process. In this case, the carrier substrate is taken up from a supply roll, processed, in particular by means of the preferred combined stamping-etching method, and subsequently wound up onto a further roll.

In the roll-to-roll process it has proved to be worthwhile to transport the carrier substrate at a speed within the range of 1 to 200 m/min, in particular 10 to 100 m/min, from roll to roll. Higher speeds are likewise possible, of course.

It is preferred if the at least one electrically conductive layer is applied over the whole area on one side of the carrier substrate. However, it is also possible to provide the electrically conductive layer only in regions on one side of the carrier substrate.

Furthermore, it has proved to be worthwhile if the at least one electrically insulating carrier substrate comprises at least one first electrically conductive layer applied to a first side of the carrier substrate, if the at least one electrically insulating carrier substrate comprises at least one second electrically conductive layer applied to a second side of the carrier substrate and if the at least one first electrically conductive layer and/or the at least one second electrically conductive layer have/has at least one antenna structure. Thus, in each case at least one electrically conductive layer is applied on each side of the carrier substrate and can comprise in each case one or a plurality of antenna structures. In this case, either only one or both the electrically conductive layers can be structured as described.

In this case, it has proved to be favorable for some applications if an electrically conductive connection is formed between the at least one first electrically conductive layer and the at least one second electrically conductive layer, the latter being arranged in a manner electrically insulated from the at least one first electrically conductive layer, by means of an electrically conductive contact means. An electrically conductive connection between the two electrically conductive layers, which are otherwise present in the manner electrically insulated from one another on the carrier substrate, is therefore provided at one or a plurality of locations of the carrier substrate.

It has furthermore proved to be worthwhile if the at least one electrically conductive layer has a thickness within the range of 10 nm to 100 µm. Finally, it is preferred if the electrically conductive layer is formed from metal, a metal alloy, a conductive paste, a conductive ink or a conductive organically based material. Copper, nickel, aluminum, chromium, iron, zinc, tin, silver, gold, platinum and cobalt have proved to be worthwhile as metal or constituents of the metal alloys. Silver or copper conductive pastes are preferably used as conductive pastes. Pastes containing a mixture of organically conductive and inorganically conductive materials have also proved to be worthwhile. Furthermore, doped or undoped semiconducting materials can be used for specific applications, said materials being organically or inorganically based. Conductive inks contain, for example, conductive materials such as silver in the form of a silver complex or as nanoparticles, a thermal step often being required after the ink has been applied.

In particular, it has proved to be worthwhile if the at least one electrically conductive layer comprises at least two different electrically conductive layer portions.

Thus, using the above-described combined stamping-etching method that is preferred for the structuring of the electrically conductive layer, it is possible for example to use a copper layer and a gold layer arranged thereon as electrically conductive layer. The gold layer is severed during the stamping and the etching is subsequently carried out, an etchant being chosen such that it is matched to the copper and does not attack the gold or attacks the gold only slightly. In this case, the etchant acts to an increased extent in the region of the stamping gap in which the copper is present in activated fashion and in a manner freely accessible to the etchant, while a superficial erosion of the electrically conductive layer is largely avoided on account of the gold coat.

The application of the at least one electrically conductive layer to the carrier substrate can be effected in various ways, where different methods can be used in combination. In particular, methods such as application by lamination, adhesive bonding, sputtering, vapor deposition, casting, printing, electrodeposition etc. are suitable.

It has proved to be worthwhile if the contour of at least one island region is embodied in the form of an alphanumeric character, a symbol, a graphical representation, a geometrical figure or a figurative representation. In particular, it has proved to be worthwhile if a plurality of island regions together form a lettering, a logo, a company emblem, an image or a graphical pattern. Data relating to the respective manufacturer of the antenna arrangement can thereby be integrated.

In particular, at least one island structure can be used in such a way that it forms a further technical component, such as, for example, an electrode (in particular for an optical element), a sensor, a battery, a photovoltaic cell, an electrical switch or push button, and the like.

The antenna configuration can comprise not just one but a plurality of antenna structures which are surrounded by island structures and which are arranged on one or both sides of the carrier substrate.

A use of an antenna configuration according to the invention for contactlessly coupled transponders, in particular for radio labels such as RFID tags (radio frequency identification tags), is ideal. A use for further radio labels such as EPC (Electronic Product Code) labels or EAS (Electronic Article Surveillance or Antitheft Protection) tags is possible. Radio labels of this type are based on nationally and internationally released frequency bands for signal transmission; these are typically: 125-135 kHz, 13.56 MHz, 860-950 MHz or 2.45

GHz. However, other frequency bands can in part also be used, such as e.g. 1-9 MHz for antitheft protection tags. Frequency ranges of 1.86 to 2.18 MHz and 7.44 to 8.73 MHz are typically used for this application.

In particular, a use of a spiral antenna configuration for forming an RFID tag for the high-frequency range, in particular for a frequency of 13.56 MHz, is ideal. Furthermore, a use of an antenna configuration having an antenna structure formed as a dipole, in T-shaped fashion, in L-shaped fashion, in U-shaped fashion, or as a combination of such structures, for forming an RFID tag for the ultrahigh-frequency range, in particular for a frequency range of 800 to 950 MHz, is ideal.

Radio labels or RFID tags are often used for protecting and identifying external packaging of foodstuffs, tobacco products, etc. Furthermore, the area of logistics in particular in production line automation, parcel logistics and the so-called electronic product code EPC®, as sought by the international association EPCglobal, with regard to a logistical chain from the manufacturer of a product to the supermarket. Furthermore, RFID tags are used for identification purposes, for ski passes, company identity cards, passports and the like.

So-called "Smart Tags" exist, in addition, which have further functions in addition to an RFID function and for which the antenna configurations according to the invention are likewise suitable. Such "Smart Tags" are able, for example, to record a temperature profile, to provide the function of a credit card or to function as a sensor.

FIGS. 1a to 4 will elucidate antenna configurations according to the invention by way of example. Thus:

Figure 1A:
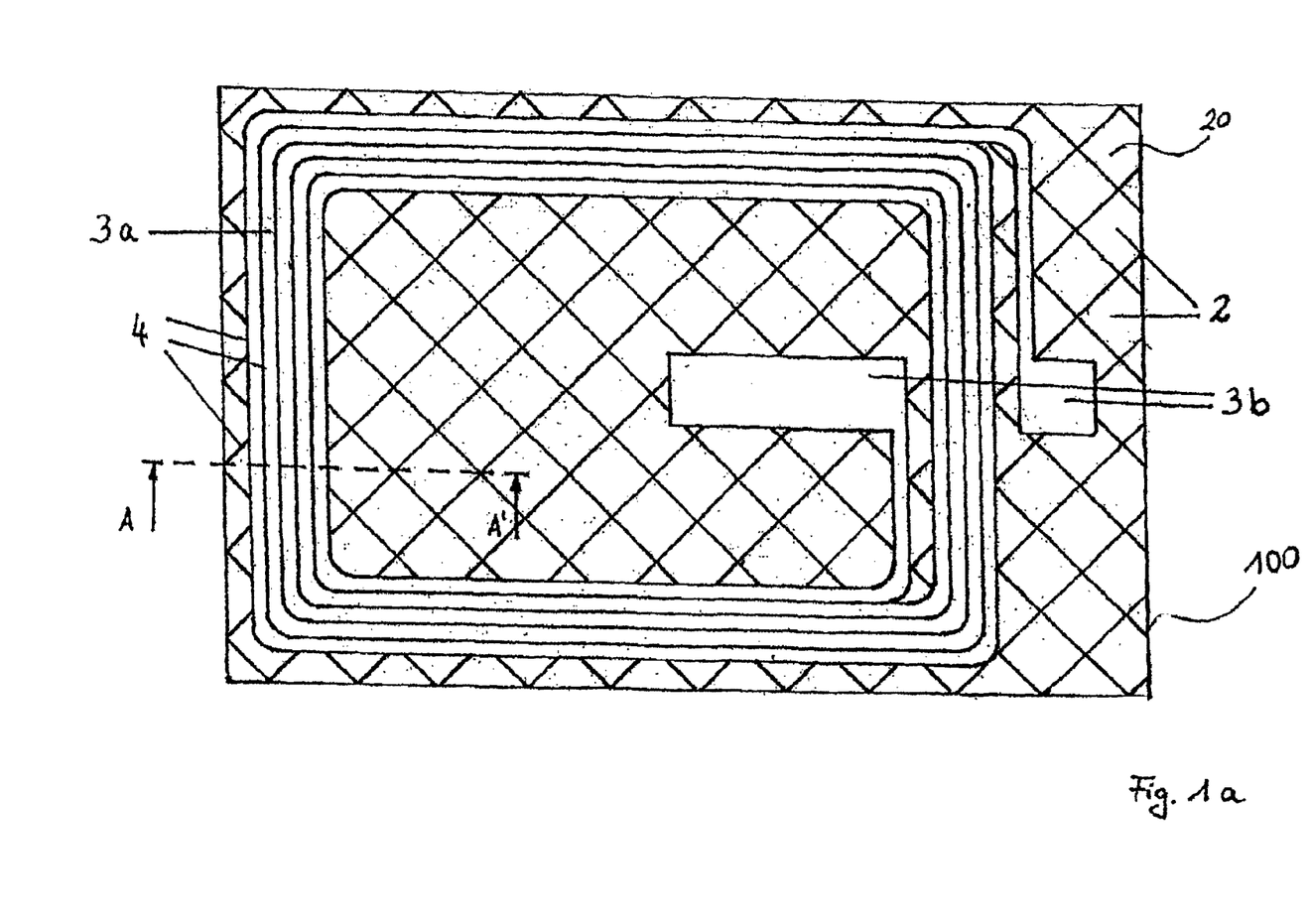
FIG. 1a shows an antenna configuration with a spiral antenna structure in plan view.

FIG. 1a shows an antenna configuration 100 in plan view regarding an electrically conductive layer 20 composed of copper. The electrically conductive layer 20 is structured by means of stamping and subsequent etching, an antenna structure 3a in the form of a spiral with electrical contact areas 3b being formed. The regions of the electrically conductive layer 20 which are arranged inside the antenna structure 3a and outside the latter are divided into rhomboidal island regions 2, which are electrically insulated from one another, likewise by means of stamping and subsequent etching. Insulation trenches 4 (also see FIG. 1b) are formed between the island regions 2 and the antenna structure 3a and also the contact areas 3b. Insulation trenches 4 of this type are also arranged between the individual turns of the antenna structure 3a.

Figure 1B:
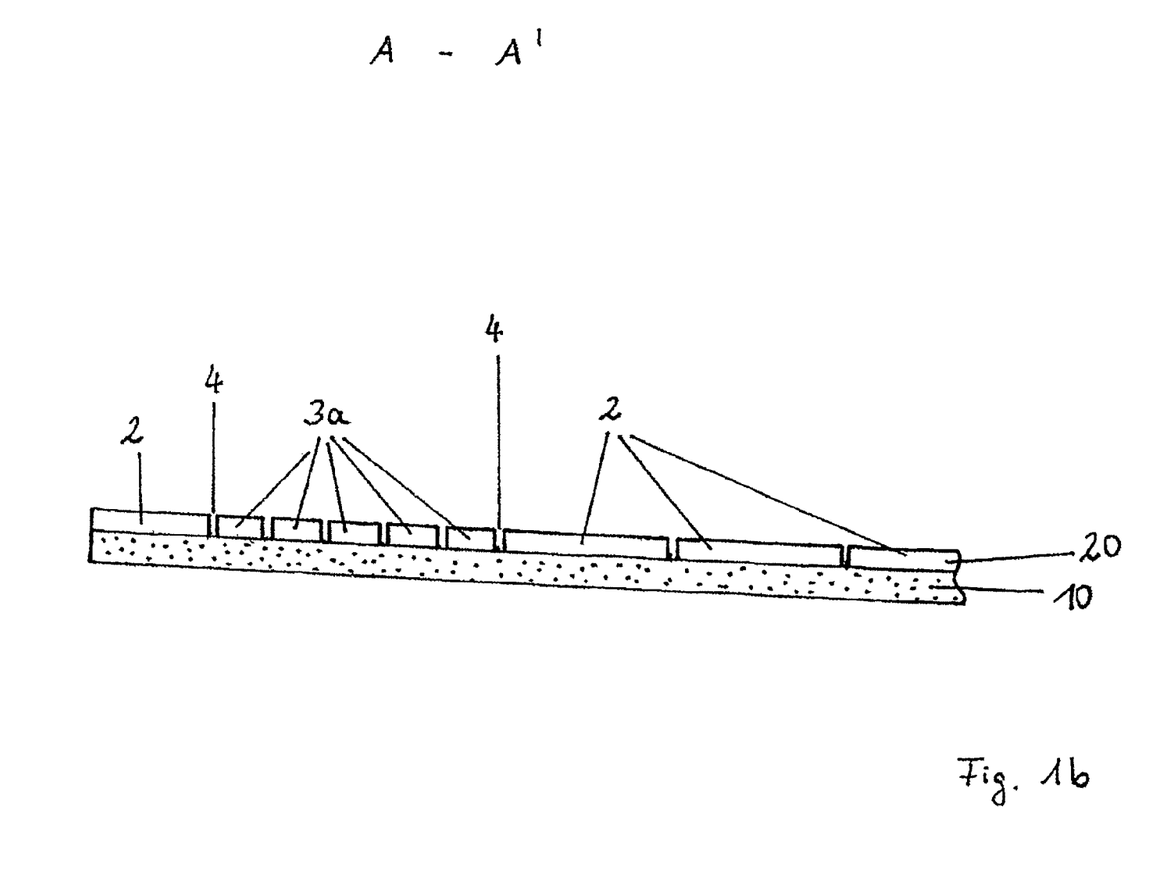
FIG. 1b shows the antenna configuration from FIG. 1a in sectional view A-A'.

FIG. 1b shows a region of the antenna configuration 100 from FIG. 1a in section A-A'. This view also reveals the carrier substrate 10, which is formed from PET film having a thickness of 12 μm, on which the electrically conductive layer 20 composed of copper has been arranged and structured in the form of the antenna structure 3a and the island regions 2.

Figure 2A:
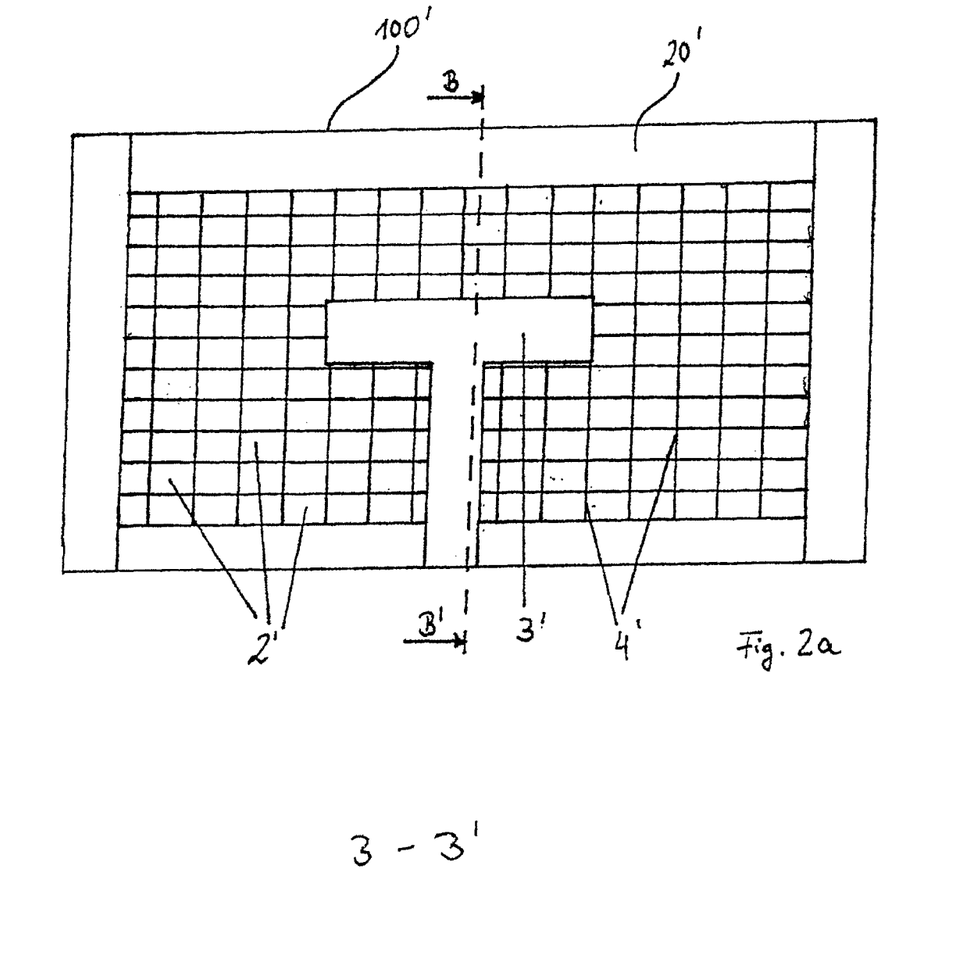
FIG. 2a shows a further antenna configuration with a T-shaped antenna structure in plan view.

FIG. 2a shows a further antenna configuration 100' in plan view regarding an electrically conductive layer 20' composed of copper. The electrically conductive layer 20' is structured by means of stamping and subsequent etching, a T-shaped antenna structure 3' being formed. The regions of the electrically conductive layer 20' which are arranged around the antenna structure 3' are divided into rectangular island regions 2', which are electrically insulated from one another, likewise by means of stamping and subsequent etching. Insulation trenches 4' (also see FIG. 2b) are formed between the island regions 2' and the antenna structure 3'. Insulation trenches 4' of this type are also arranged between the individual island regions 2'.

Figure 2B:
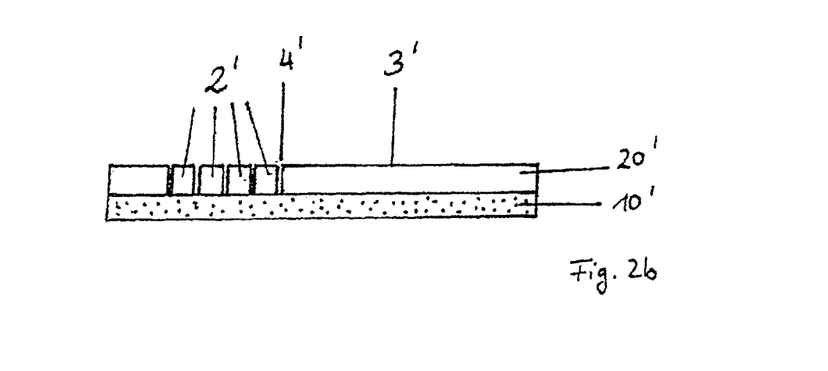
FIG. 2b shows the antenna configuration from FIG. 2a in sectional view B-B'.

FIG. 2b shows a region of the antenna arrangement 100' from FIG. 2a in section B-B'. This view also reveals the carrier substrate 10', which is formed from PET film having a thickness of 12 μm, on which the electrically conductive layer 20' composed of copper has been arranged and structured in the form of the antenna structure 3' and the island regions 2'.

Figure 3A:
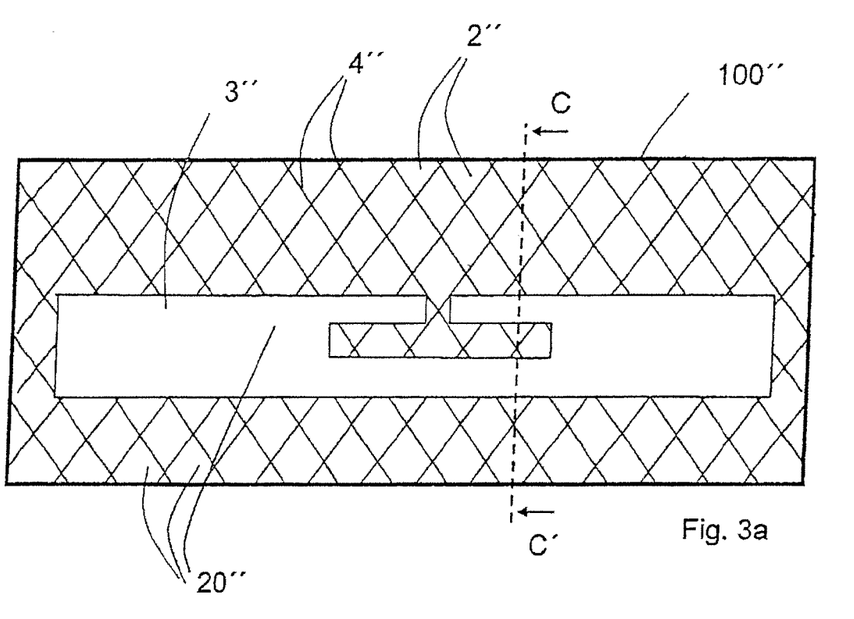
FIG. 3a shows a further antenna configuration with a dipole-type antenna structure in plan view.

FIG. 3a shows a further antenna configuration 100" in plan view regarding an electrically conductive layer 20" composed of copper. The electrically conductive layer 20" has been structured by means of stamping and subsequent etching, a dipole-type antenna structure 3" being formed. The regions of the electrically conductive layer 20" which are arranged around the antenna structure 3" are divided into rhomboidal island regions 2", which are electrically insulated from one another, likewise by means of stamping and subsequent etching. Insulation trenches 4" (also see FIG. 3b) are formed between the island regions 2" and the antenna structure 3". Furthermore, insulation trenches 4" of this type are arranged between the individual island regions 2".

Figure 3B:
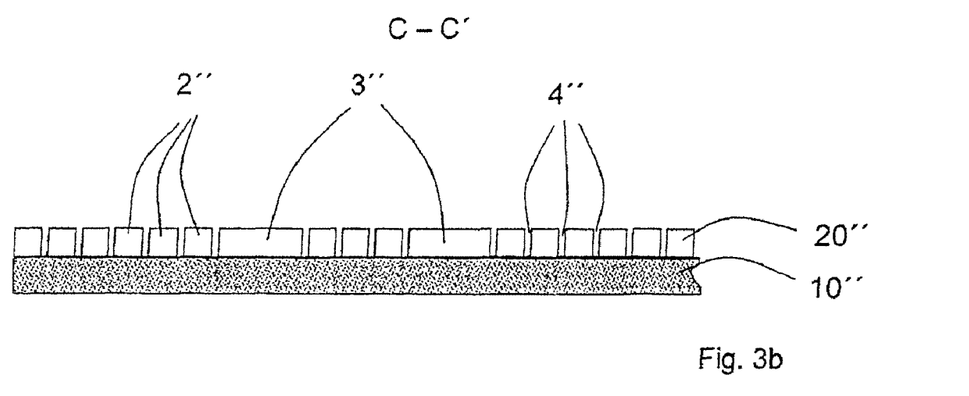
FIG. 3b shows the antenna configuration from FIG. 3a in sectional view C-C'.

FIG. 3b shows a region of the antenna configuration 100" from FIG. 3a in section C-C'. This view also reveals the carrier substrate 10", which is formed from PET film having a thickness of 12 μm, on which the electrically conductive layer 20" composed of copper has been arranged and structured in the form of the antenna structure 3" and the island regions 2".

Figure 4:
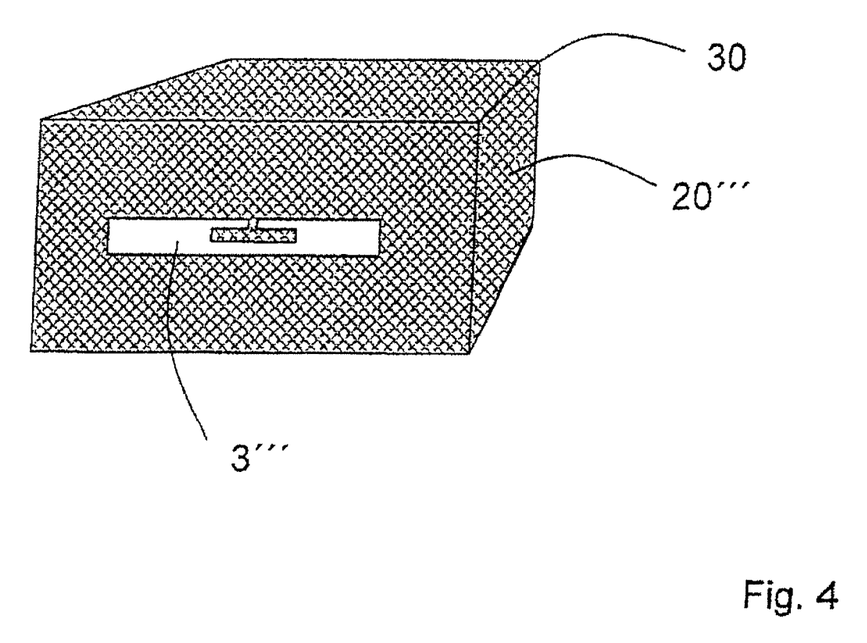
FIG. 4 shows an exemplary application of an antenna configuration in the area of a packaging.

FIG. 4 shows an exemplary application of an antenna configuration in accordance with FIG. 3a in the area of a rectangularly shaped packaging 30. Integrated into the packaging 30 is an RFID antenna in the form of the antenna structure 3", which is surrounded by island regions (not numbered here) and which cover the surface of the packaging.

It goes without saying that different antenna configurations and antenna structures than those shown can also be formed or different layer constructions can be provided on the carrier substrate, without departing from the concept of the invention.

The invention claimed is:
1. An antenna configuration comprising:
at least one electrically insulating carrier substrate having opposing sides ; and
at least one electrically conductive layer on at least one of the sides of the carrier substrate, wherein the electrically conductive layer has a first area region and a second area region, the first area region of the electrically conductive layer comprising at least one antenna structure electrically insulated from the second area region of the electrically conductive layer by an insulation trench in the conductive layer, and wherein the second area region of the electrically conductive layer is subdivided, at least in regions directly adjacent to the at least one antenna structure, into island regions that are electrically insulated from one another, wherein the second region subdivisions are arranged to minimize antenna power impairment due to interference caused by reflection of electromagnetic material and/or disturbing eddy currents in the second region.

2. The antenna configuration as claimed in claim 1 wherein, as seen perpendicularly to the plane of the electrically conductive layer, each island region has a maximum dimension that is ≦50% of a maximum dimension of the at least one antenna structure.

3. The antenna configuration as claimed in claim 2, wherein as seen perpendicularly to the plane of the electrically conductive layer, each island region has a maximum dimension that is ≦10% of the maximum dimension of the at least one antenna structure.

4. The antenna configuration as claimed in claim 1, wherein as seen perpendicularly to the plane of the electrically conductive layer, the electrically conductive layer is subdivided into island regions up to at least a distance A away from the at least one antenna structure as seen from each point of the at least one antenna structure, the distance A being at least 50% of the maximum dimension of the at least one antenna structure.

5. The antenna configuration as claimed in claim 1 wherein the electrical insulation trench is between the at least one antenna structure and the second area region of the electrically conductive layer and comprises one of a severance of the electrically conductive layer or a reduced thickness of the electrically conductive layer.

6. The antenna configuration as claimed in claim 1 including a further electrical insulation trench between the adjacent island regions, which, as seen perpendicularly to the at least one electrically conductive layer, has a width of less than 100 μm.

7. The antenna configuration as claimed in claim 6, wherein the further electrical insulation trench comprises one of a severance of the electrically conductive layer or a reduced thickness of the electrically conductive layer.

8. The antenna configuration as claimed in claim 1 wherein the at least one electrically conductive layer is over all of the at least one side of the carrier substrate.

9. The antenna configuration as claimed in claim 1 wherein the at least one antenna structure comprises a spiral having at least one turn which encloses a first portion of the second area region.

10. The antenna configuration as claimed in claim 9 wherein the at least one turn is enclosed by a further second area region portion subdivided into further island regions.

11. The antenna configuration as claimed in claim 1 wherein the at least one antenna structure comprises a dipole having one of a T-shape, L-shape, U-shape or combination thereof.

12. The antenna configuration as claimed in claim 1 wherein the carrier substrate has a thickness within the range of 10 μm to 5 mm.

13. The antenna configuration as claimed in claim 1 wherein the carrier substrate comprises a plastic film composed of one or more of PET, PP, PPS, PES, PEN, polyimide, and/or a paper or cardboard layer.

14. The antenna configuration as claimed in claim 1 wherein the carrier substrate comprises at least two different layers.

15. The antenna configuration as claimed in claim 1 wherein the at least one electrically conductive layer has a thickness within the range of 10 nm to 100 μm.

16. The antenna configuration as claimed in claim 1 wherein the at least one electrically conductive layer is one of a metal, a metal alloy, a conductive paste, a conductive ink, a conductive organically based material, or a doped or undoped semiconducting material.

17. The antenna configuration as claimed in claim 1 wherein the at least one electrically conductive layer comprises at least two different electrically conductive layer portions.

18. The antenna configuration as claimed in claim 1 wherein the at least one island region of said island regions comprises one of an alphanumeric character, a symbol, a geometrical figure or a figurative representation.

19. The antenna configuration as claimed in claim 1 wherein a plurality of said island regions form at least one of a lettering, a logo, a company emblem, an image or a graphical pattern.

20. The antenna configuration as claimed in claim 1 wherein the at least one electrically conductive layer comprises at least one second electrically conductive layer on a second side opposing the one side of the carrier substrate and wherein the at least one antenna structure is in one of the at least one first electrically conductive layer and/or the at least one second electrically conductive layer.

21. The antenna configuration as claimed in claim 20 further including an electrically conductive connection contact for electrically interconnecting the at least one first electrically conductive layer and the at least one second electrically conductive layer, the latter otherwise being electrically insulated from the at least one first electrically conductive layer.

22. A method of employing the antenna configuration as claimed in claim 1 comprising contactlessly coupling the at least one antenna structure of claim 1 to a plurality of radio-frequency identification (RFID) tags or RF antitheft protection tags.

23. A method of employing the antenna configuration as claimed in either of claims 9 and 10 comprising coupling the at least one antenna structure of either of claims 9 and 10 to an RFID circuit for forming an RFID tag operating at a frequency of 13.56 MHz.

24. A method of employing the antenna configuration as claimed in claim 11 by forming the antenna as part of an RFID tag operating in one of the ultrahigh-frequency ranges of 800 to 950 MHz or 2 to 2.5 GHz, or by capacitively coupling the at least one antenna structure of claim 11 to a circuit.

25. A method of employing the antenna configuration as claimed in claim 1 by forming the at least one antenna structure into an RFID antenna and integrating the at least one antenna structure into a packaging.

26. A method of employing antenna structure as claimed in claim 1 including incorporating the at least one island region as a component of a circuit.

27. The method of employing the component of claim 26 including forming the component as at least a portion of a sensor, a battery, a photovoltaic cell, an electrical switch, or an electrode for an optical element.

28. The antenna configuration as claimed in claim 1 wherein the insulation trench, as seen perpendicularly to the at least one electrically conductive layer has a width of less than 100 μm.

* * * * *